April 27, 1965     R. B. HELLER     3,180,083
GAS PROCESSING METHOD AND APPARATUS
Filed June 5, 1961     2 Sheets-Sheet 1
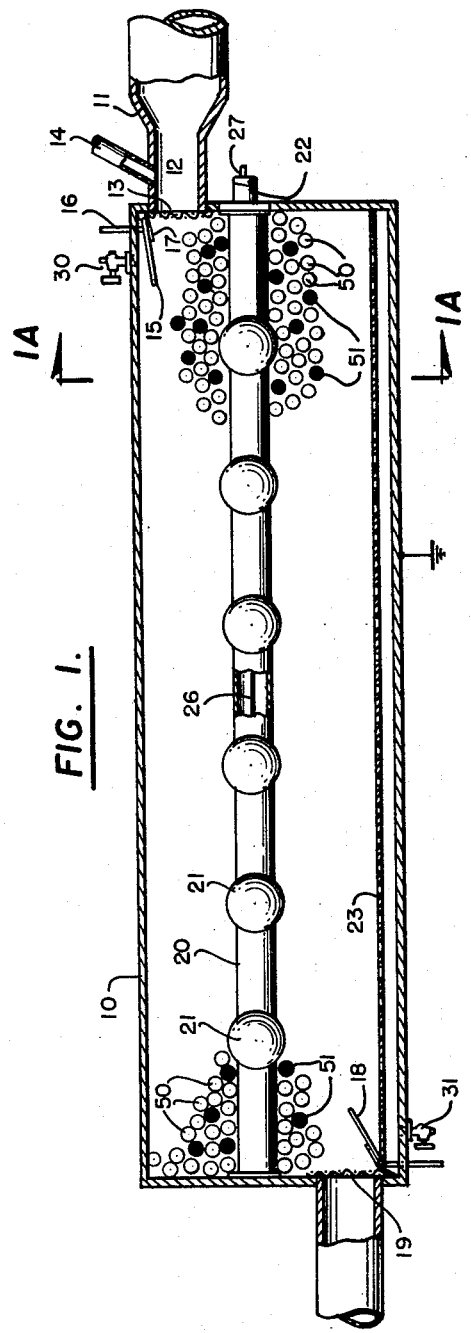
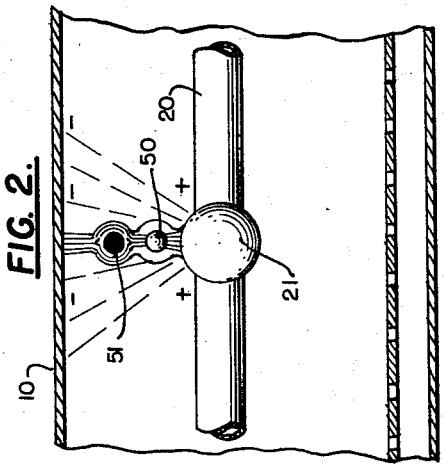
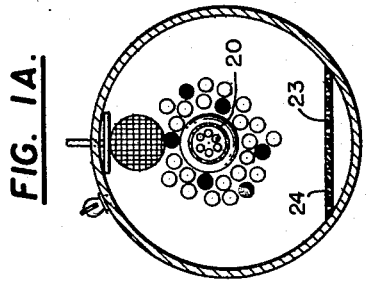
INVENTOR
Robert Heller
BY *Moore and Hall*
ATTORNEYS April 27, 1965   R. B. HELLER   3,180,083
GAS PROCESSING METHOD AND APPARATUS
Filed June 5, 1961   2 Sheets-Sheet 2
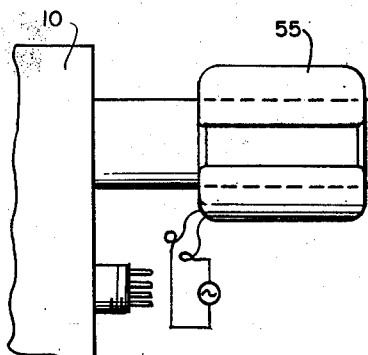
FIG. 3.
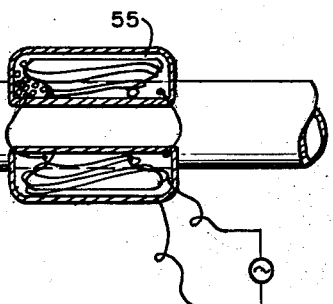
FIG. 4.
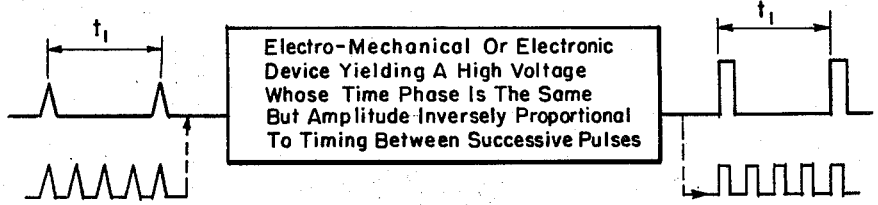
Electro-Mechanical Or Electronic Device Yielding A High Voltage Whose Time Phase Is The Same But Amplitude Inversely Proportional To Timing Between Successive Pulses
FIG. 5.
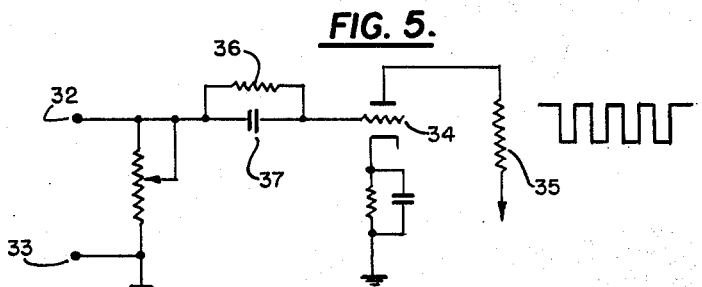
FIG. 6.
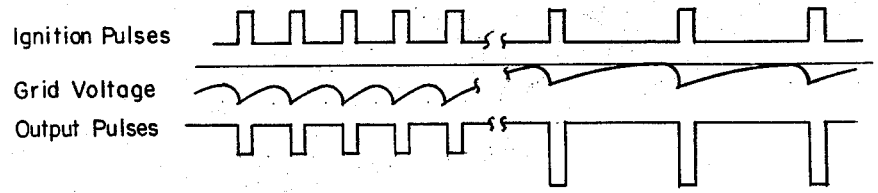
Ignition Pulses
Grid Voltage
Output Pulses
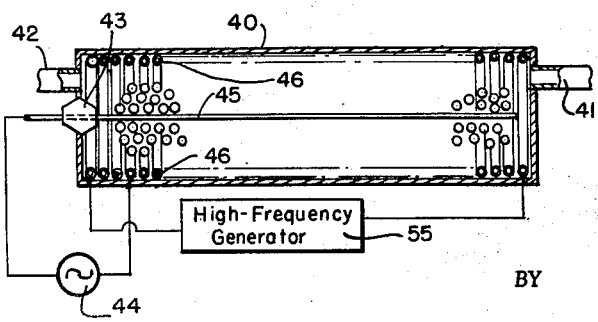
FIG. 7.
INVENTOR
Robert Heller
BY *Moon and Hall*
ATTORNEYS

United States Patent Office

3,180,083
Patented Apr. 27, 1965

3,180,083
GAS PROCESSING METHOD AND APPARATUS
Robert B. Heller, 1111 Loxford Terrace, Silver Spring, Md.
Filed June 5, 1961, Ser. No. 114,721
6 Claims. (Cl. 60—29)

This invention relates to a method and apparatus for processing e.g. catalytic cracking a gaseous mixture, and more particularly relates to a method and apparatus for processing the exhaust gases which issue from an internal combustion engine. The present invention is to be clearly distinguished, however, from electrostatic precipitation methods and apparatus. The underlying principle for the method and apparatus stems from the discovery that the "effective" surface of an electrically conducting catalyst can be increased by suspending said conductor in an ungrounded state in an appropriately shaped electric field.

Considerable research effort has been expended in an effort to discover a practical method by which the exhaust gases issuing from an internal combustion engine may be treated to reduce appreciably the amount of contaminants that are introduced into the atmosphere and which tend to result in the formation of objectionable smog. Various devices have been suggested and methods worked out for the purpose of accomplishing this objective, but they have for the most part not been satisfactory either because the reduction in the amount of contamination is small or else the required apparatus to carry out the process is complex and thus necessarily too expensive to be required for installation on all vehicles.

Described briefly, it is contemplated by the present invention to pass the compression wave of discharged gases as they issue from the respective cylinders of an internal combustion engine through an enclosed chamber and by so doing cause the gas mass to be subjected to the combined effects of the ionization of strong electric fields which are preferably intermittently applied. The enhanced catalytically induced cracking or burning takes place in the vicinity of numerous small catalytic conductive bodies which are randomly suspended throughout the space within the chamber and are, for the most part, electrically insulated from each other and from the walls and other internal parts of the chamber.

In this process, the growth of individual gas particles is encouraged and also numerous gas particles are ignited as a result of their reaching their autoignition temperature. Thus, various particles and droplets, which are quite highly ionized, move in the vicinity of and are further attracted toward the conductive bodies and in so doing are caused to pass through a strong dipole electrical field surrounding them. As will be shown, this additional dipole field increases the effective temperature of the particles and droplets and also causes them to spend more time near the catalyst surface. Upon contact with the conductive bodies, many of these particles and droplets have their temperature raised above their autoignition temperature so that they are burned. If not burned, many are cracked. The ignition of these particles together with the growth of many other particles during transit through the chamber combine their effects so that the discharged gas has many of the contaminants removed or else the contaminants left are of such a nature with respect to their particle size that they fall by gravity to the roadway and have practically no tendency to produce long-time contamination or smog. The electrical field has the further effect of aiding in the removal, from the vicinity of each of the conductive catalytic bodies, the residues which result from the burning of the particles and droplets and the fact that the applied electrical field is intermittent in nature considerably enhances this effect in conjunction with the velocity of the gas. The result of this is to prevent the accumulation of a buffering zone of oxidized gases and other residues which would otherwise affect the efficiency of the various conductive bodies. In a preferred embodiment of the invention, the conductive bodies are randomly intermixed with non-conductive dielectric bodies, such as small glass spheres. The principal function of such dielectric bodies is to support the conductive bodies randomly and in an ungrounded state throughout the interior of the chamber. This ungrounded support of conductive bodies in the prime electric field produced by the main chamber produces the required "concentrated" dipole field around the catalyst surface and will be discussed later. The polarity of the applied electric field is unimportant. Additionally, however, it is believed that the supporting dielectric bodies have, in themselves, a decided effect in aiding in the combustion of the gas particles and droplets if their surfaces also possess catalytic properties.

It is therefore an object of the present invention to provide apparatus for the processing of a gaseous mixture which comprises means for subjecting the gas to an electrical field for ionizing purposes and a dipole field surrounding conductive catalysts which aids in the autoignition or cracking of various gas particles.

Another object of this invention is to provide a method for removing contaminants from gaseous mixtures which comprises passing the gases through a chamber containing interspersed conductive particles and applying a time and distance-spaced electrical field to the interior of the chamber, whereby numerous waves of gas particles traveling through the chamber find themselves in an environment which results in their being automatically ignited.

Another object of this invention is to provide a method and apparatus for treating the discharge gases from an internal combustion engine which comprises passing the discharged waves of gases through a chamber and subjecting them in transit to an electric field which is highly concentrated in the vicinity of numerous catalytic surfaces, whereby many of the gas particles encounter an environment where the effective temperature exceeds their autoignition temperature so that they become ignited or are catalytically cracked with the result that here are fewer unburned gas particles in the final exhaust.

Another object of this invention is to provide a method or apparatus for the treatment of gas mixtures containing unburned hydrocarbons which involves passing the gases through a confined space which is substantially filled with conductive bodies which are randomly interspersed throughout the space in an ungrounded state by reason of their being intermixed with numerous non-conductive dielectric bodies and with a relatively strong electrical field being intermittently applied throughout the confined space.

An additional object of this invention is to provide a method and apparatus for the treatment of a gaseous mixture containing unburned hydrocarbons which comprises passing the high velocity gases through a strong magnetic field to sustain the ionization of the gas particles and droplets prior to subjecting such particles and droplets to an electrical field.

Another object of this invention is to process the exhaust gases from an internal combustion engine by passing the gases through a processing chamber and subjecting the gas particles to an electrical field which may be intermittently applied and whose intensity varies inversely with car or engine speed so that the electrical field is at a maximum when the engine speed is at a minimum.

Other objects, purposes, and characteristic features of the invention will in part be obvious from the accompanying drawings and in part pointed out as the description of the invention progresses.

In describing the invention in detail, reference will be made to the accompanying drawings in which like reference characters throughout the several views indicate corresponding parts and in which:

FIG. 1 is a longitudinal cross-sectional view of the gas processing chamber of the present invention;

FIG. 1A is a transverse cross-sectional view of the gas processing chamber of FIG. 1;

FIG. 2 illustrates a portion of the gas processing chamber of FIG. 1, particularly illustrating the non-homogeneous electrical field which is produced;

FIG. 3 illustrates an alternative means by which increased ionization of the gas particles and droplets is effected by passing them through a magnetic field.

FIG. 4 illustrates diagrammatically how the intensity of the electrical field in the processing chamber may be varied in accordance with engine speed;

FIG. 5 illustrates a typical circuit by which the objectives diagrammatically illustrated in FIG. 4 may be carried out;

FIG. 6 illustrates the waveforms of the operation of a circuit of FIG. 5; and

FIG. 7 illustrates an alternative embodiment of a gas processing chamber which provides for the application of an electrical field to the space between a surrounding chamber and an inner inducting core.

Before describing in detail the scientific basis upon which the apparatus of the present invention depends, it is believed expedient to describe first one embodiment of the present invention.

Referring first to FIGURE 1, which illustrates a preferred embodiment of the invention, there is shown a processing chamber 10 which may have a cylindrical cross-section as shown particularly in FIGURE 1A. The exhaust gases which are to be processed in the chamber 10 are admitted through an inlet pipe 11 which communicates with the hollow interior of the chamber 10 through the aperture 12 which is provided in an end wall of the chamber 10.

The inlet pipe 11 is adapted to be secured to the exhaust pipe of an internal combustion engine when the device of FIGURE 1 is to be used for processing the exhaust gases of such an engine. It will be noted that screens 13 and 19 may be placed over the aperture at the end wall so as to prevent jarring from causing the spherical bodies 50 and 51 from entering pipes 11 and 19. The interior of the inlet pipe 11 is also shown in FIGURE 1 as communicating with the atmosphere through a relatively small diameter inlet pipe 14. The in-rushing gases by Venturi action cause outside air to be admitted and mixed with the exhaust gases prior to their being processed. This provides the additional needed oxygen which facilitates the combustion of the unburned residues.

The inlet pipe 12 may be selectively closed by the flap 15 which may be swung to the closed position where it covers the aperture 12 and such actuation may be effected externally by pressing downwardly upon the handle 16. The flap 15 is normally spring-biased to the open position shown in FIGURE 1 by means of a spring member 17. An additional flap 18 is associated with the aperture 19 at the opposite end of the chamber 10 and is similarly spring-biased to a normal open position.

Disposed axially along the inner portion of the chamber 10 is an insulated rod 20. As shown in FIGURE 1A, this insulating rod 20 may be centrally disposed within the center of chamber 10 and may also be of circular cross-section. This insulating rod 20 supports a plurality of conducting members 21 which may be formed of steel, copper, or other suitable electrically conductive material with or without catalytic properties. Each of the members 21 may comprise a sphere having a hollow cylindrical core which permits it to be slid over the cylindrical rod 20 during assembly and then positioned in the desired relationship along the rod 20. At least one electrical conductor or wire 26 passes along the interior of the hollow insulating rod 20 and connects to the individual spherical members 21. Wire 26 connects to terminal 27 in plug connection 22 which extends through an end wall of the chamber 10. The application of a high voltage pulse to terminal 27 results in such pulse being applied to all the conductive members 21.

The interior of the chamber 10 is provided with a double bottom which may be formed by affixing a substantially flat inner plate 23 in the interior of chamber 10 so that a separate, relatively small compartment is formed in the bottom. This plate 23 is provided with a relatively larger number of perforations as indicated at 24 in FIGURE 1A. The purpose of these perforations will later be described.

The remainder of the volume within the interior of the chamber 10 above the dividing plate 23 is substantially filled by a large number of rather small bodies. In FIGURE 1, certain of these bodies 50 are shown clear while others 51 have been shown black. The clear bodies or particles 50 are intended to represent small dielectric bodies which may be formed of glass or other similar material having dielectric as well as catalytic properties and being substantially non-conductive to electricity while at the same time being capable of withstanding relatively high temperatures. The bodies which are shown in black represent electrically conductive bodies which may be formed of any one of a number of suitable materials such as steel, copper, copper-coated steel, platinum, and the like. The conductive and dielectric bodies are inter-mixed so that they are randomly distributed throughout the inner space. In FIGURE 1, the various bodies are shown as being small spheres and of substantially the same diameter, and such form is deemed preferable but it should also be understood that the invention is not to be limited to the use of spherical bodies, nor is it essential that they all be of the same diameter. Incidentally, although the interior of the chamber 10 above the bottom plate 23 is intended to be substantially filled by these bodies, it is nevertheless desirable that they not be packed in too tightly, since it has been found that a relatively loose packing tends to permit relative motion of the various bodies, not only in response to vibration of the entire device in use but also in response to the action of each advancing compression wave front passing through the chamber 10, and such relative motion tends to produce what may be termed a "scrubbing" effect which has the effect of keeping at least a portion of the surface clean, thereby enhancing its catalytic life.

As previously stated, an important aspect of this invention is the random dispersal of the ungrounded conductive bodies throughout the interior of chamber 10. Preferably this is effected by intermixing such bodies with an experimentally predetermined ratio of spacing bodies so that statistically it is unlikely that the conductive bodies form a direct "short" between the wall of the chamber and the inner conducting spheres 21. Of course, other methods may equally well be used to effect these results, and it is thus not imperative that non-conductive bodies be used.

In operation, the exhaust gas treating apparatus of FIGURE 1 may take the place of the usual muffler normally employed with an internal combustion engine, with the inlet pipe being connected to the engine exhaust pipe. When the engine is first put into operation, the interior of the chamber 10 quickly becomes filled with exhaust gases. As is well known, the exhaust gases from such an engine do not emerge therefrom in a steady stream but are instead released periodically as each respective cylinder of the engine goes through its exhaust stroke with its exhaust valve open. Because of this, there exists at any time within the chamber a plurality of compression wave fronts which are successively spaced throughout the length of the chamber and which are all advancing toward the outlet pipe which is toward the left-hand end of the chamber 10 as viewed in FIGURE 1 and which communicates with the interior of the chamber via the aperture 19. The presence of the numerous spherical bodies 50, 51 does have some tendency to diffuse the successive wave fronts in their travel through the chamber, but even near the exhaust end of the chamber 10 distinct time-spaced pressure variations are found to occur at any given measuring point.

As has previously been mentioned, a relatively high electrical voltage is applied to the various spherical conductive members 21, with electrical connection being made to such members through the hollow interior of the insulating rod 20. All of the various conductive spheres 21 may at the same time have such voltage applied thereto, and the ignition system of the internal combustion engine itself may be used to effect the proper timing of the pulses so that a discrete voltage pulse is applied for each firing of a cylinder of the engine. The spacing of the successive conductive spheres 21 may be selected along the axial length of the chamber 10 so that each will have the voltage pulse applied thereto at a time when an advancing compression wave front of the exhaust gases is adjacent thereto. This may result in having the spacing between successive conductive spheres non-uniform, but it will be appreciated that one can readily determine experimentally what the desired spacing should be in order that each sphere 21, when energized by a voltage pulse at the time of ignition of a respective engine cylinder, will be closest to one of the successive wave fronts of gas which is continuously passing through the chamber 10. It is, of course, recognized that this spacing is dependent upon engine speed; when engine speed is contemplated to be variable, the spacing may be in accordance with some preselected speed.

In selecting the conductive and the dielectric bodies which are to fill the space within the chamber 10, consideration must, of course, be given not only to the nature of the materials employed but also to their sizes. One factor which must be considered is that the impedance that is presented to the gas stream must not be too high. In these connections, it has been found that small spherical particles of substantially uniform diameter of one-quarter centimeter will, when quite closely packed within the available volume, nevertheless present a quite low impedance so that there is a quite negligible pressure differential between the inlet end and the exit end of the device in FIGURE 1. With respect to the nature of the materials employed, the factors which must be taken into account include their catalytic properties and also their cost. Small, copper or polished steel balls may be used for the conductive bodies 51, but improved results are obtained when at least the surfaces of the conductive bodies are formed from those materials which are known to have considerable catalytic effect in the burning of hydrocarbons and the conversion of carbon monoxide to carbon dioxide. Among such materials, platinum is a notable example as well as other catalysts that are proprietary to specific manufacturers.

It has previously been established by investigators working in magnetohydrodynamics (MHD) that shock wave propagating down a tube under conditions resulting in a relatively high Mach number causes many of the gas particles to acquire a high degree of electrical charge. It is therefore to be expected that, even where the wave travels at slower speeds, conditions in the compression wave fronts will still be such that the various particles and droplets will be charged. Some of this charge, of course, tends to decay as the particles progress toward the chamber 10 since various recombinations will constantly be taking place in the pipe 11. Despite this, considerable particles retain an appreciable charge, and this phenomenon may also be utilized in practicing this invention, as will be described. Under conditions which result in excessive neutralization of gas ionization, it is possible to maintain the ionization of the gases and thus the charging of the particles prior to entering chamber 10 by passing them through a magnetic field before they enter the processing chamber. The manner in which the kinetic energy of the mass of the hot ionized gas interacts with the strong magnetic field to produce an ionizing voltage or potential is a well known principle of MHD generators. This will be described subsequently.

As the gas particles and droplets of the successive advancing wave fronts wend their way through the conductive and dielectric spheres with which the chamber is packed, each application of a high-voltage pulse between the various conductive spheres 21 and the outer grounded metallic casing results in the creating of a strong electrical field within the confines of the chamber. The manner in which such high voltage pulse is produced is not shown since any conventional means may be used. If desired, the pulse forming means may be triggered for each pulse by the ignition system of the associated engine so that one pulse is applied for each firing of the cylinder. One effect of the electrical field is to increase the amount of charge on the particles and droplets. Other results follow particularly from the peculiar nature of the electric dipole field as affected by the presence of the conductive bodies. When only two of the spheres, one a dielectric and the other a conductive sphere, are considered, as shown in FIGURE 2, the electrical field which is provided may be substantially as shown in this drawing. While such electrical fields cannot be described with great accuracy, it is believed from theoretical considerations that the representation of FIGURE 2 is essentially correct. Thus, the lines representing the electric field are shown in FIGURE 2 as passing for the most part through such dielectric bodies so that only a quite weak dipole moment is produced around it. The dipole moment for the dielectric sphere may be represented by the equation $$M_1 = E_0 r^3 \frac{K_1 - K_2}{2K_2 + K_1}$$

when $E_0$ represents the strength of the external field, $r$ the sphere radius, $K_1$ the dielectric constant of the sphere and $K_2$ the dielectric constant of the medium around the sphere.

By contrast, the electric dipole moment for the metallic ungrounded sphere may be represented by the equation $M_2 = E_0 R^3$, where R is the radius of the metal sphere. A comparison of these two mathematical expressions clearly shows that, for spheres of equal radius, the dipole field of the ungrounded, conductive sphere in its immediate vicinity exceeds that of a comparable dielectric sphere. This can also be seen in FIGURE 2 where the lines representing the field are shown as encircling the conductive sphere, thereby producing a non-homogeneity in its vicinity so that the field is considerably intensified in such region.

Since a rather considerable number of ungrounded, conductive spheres are interspersed throughout the space inside the chamber, there is a high statistical probability that any particular droplet will find itself within the influence of the electrical dipole field surrounding a particular conductive sphere. Depending upon the path of its approach toward the sphere as that charged droplet is blown through the chamber, it may be repelled from or, attracted to the sphere or gyrate around the sphere's surface. If it is repelled from the sphere, it will likely be attracted toward some other sphere subsequently. If it is attracted toward the sphere, it then passes through a very intensive field, thereby acquiring increased energy. When such particle collides with the sphere which is already at an elevated temperature because of being heated by the exhaust gases, the effect of the increased energy acquired by the droplet is as if the sphere were at a temperature above its thermal temperature. Where this effect is sufficiently pronounced, the effective temperature is above the autoignition temperature of the droplet so that burning occurs. The scientific and mathematical support for this phenomenon, i.e. the increase in effective temperature, is based upon the fact that the charged droplets see a potential energy drop in the vicinity of a metal sphere which is equal to $qE_0(r)$, where $q$ is the charge on the drop and $E_0(r)$ represents the radial component of the external field in the direction of the center of the sphere. Since $qE_0(r)$ is shown to be equal to $\frac{1}{2}kT$ where $k$ is Boltzmann's constant and T is the temperature equivalent, it follows that the air-gas mixture at the surface of the metal sphere will encounter an equivalent temperature which can be represented by the expression $$T = \frac{2qE_0(r)}{k}$$

which is, of course, in addition to the normal ambient temperature of such sphere a curl motion or gyration along the sphere's surface increases the effect of the catalyst surface to mechanically crack long chain organic molecules such as unburned gasoline.

Considering now some of the additional scientific phenomena which are involved in the above-described process and apparatus, it is well-known that the potential energy of a drop resulting from its surface tension alone is equal to the area of the drop multiplied by its surface tension, i.e. its potential energy equals $4\pi r^2 T$, where $r$ is equal to the radius and T represents the surface tension. Potential energy thus is found to increase with increase of drop size. It also follows that, with respect to a given drop, an increase in its surface tension alone will tend to reduce the size of the drop or, in other words, to assist in its evaporation, since there is always a tendency in any system to reduce its potential energy to a minimum. On the other hand, the potential energy of a drop which results from a charge upon it is equal to $e^2/2r$, where $e$ represents the amount of charge and $r$ again is the drop radius. From this expression, it can be seen that the effect of adding charge to a drop is to tend to increase its size if gas vapor exists around it. Therefore, the effect of electrical charge acts in a sense opposite to that of surface tension and thus a charged drop tends to grow under the same conditions wherein an uncharged drop of the same size would otherwise tend to evaporate. Such increase in size is in itself effective to reduce smog formation since it tends to reduce the number of very fine aerosol particles which are discharged and which have been shown to be particularly conductive to the formation of smog.

An additional thermodynamic phenomenon becomes effective when the electrical field is removed from the conductive spheres 21 of FIGURE 1. Thus, it has been shown by Epstein in his book entitled "Textbook of Thermodynamics," Chapter 17, published in 1937 by John Wiley & Sons, that a charged gas while in an electrical field possesses a temperature which is uniform throughout, while the pressure is not uniform but instead changes with the applied potential. Therefore, upon the removal of the electrical field from the conductive spheres 21, there is a change in the internal potential energy of the various droplets which results in a change in internal energy of the droplets and a resulting drop of pressure. This pressure drop is accompanied by a temperature rise in the droplets at such point according to the ideal law. This further increase of temperature of the unburned gasoline droplets aids in its catalytic burning or "cracking."

The electric field surrounding the ungrounded, non-dielectric sphere also has a pronounced effect in removing the products of combustion which might otherwise tend to adhere to its surface and also form a buffer around it, thereby reducing its catalytic effectiveness sharply. More specifically, some of the particles which remain in the vicinity of the conductive sphere are charged, and the polarity of their charge relative to the field is such that they are repelled from the sphere's surface. Of course, other particles have a polarity of charge which is of such nature relative to the electric field at their particular location that they are instead attracted toward the sphere's surface or merely curl around. As to such particles, they remain attracted only so long as the field is applied; upon its removal, they are freed and most are then blown away. Thus, it can be seen that the intermittent nature of the electric field is of significance in aiding the removal of the particles from the vicinity of the conductive sphere.

The small dielectric spheres may be selected from a relatively large number of available and proprietary materials of both catalytic or non-catalytic nature. Thus, glass is suitable, and the glass may be made so as to have a relatively high content of certain metallic oxides, for example, since the presence of metallic oxides tends to expedite the catalytic action of carbon monoxide and steam. Various types of metals may also be selected for the small metallic spheres and several representative metals for this use have already been mentioned. In general, the more polished and less oxidized the surface of the metallic spheres, the lower will be the autoignition temperature, as has already been shown by C. E. Frank and A. V. Blackham in their paper entitled "Spontaneous Ignition of Organic Compounds" appearing at pp. 862–67 of volume 44 (1952) of Industrial Engineering Chemistry.

It is recognized, of course, that in time the various particles within the processing chamber tend to become coated with the products of combustion so that the efficiency of the unit may decrease. However, as already mentioned, a relatively loose packing of the various spheres within the chamber tends to minimize this effect, since it permits a relative motion between adjoining spheres, and this result in the removal of some of the coating which may be deposited thereon so that at least a partially clean surface is presented for a substantial period of use of the device. However, periodic servicing is still required and it is intended that this may be accomplished without requiring removal of the unit from the engine with which it is associated. Thus, when servicing is required, both the flaps 15 and 18 may be operated from their normal position to a position where each blocks off the associated aperture. Following this, a cleaning fluid may be admitted to the interior of the chamber through an open petcock 30. The cleaning fluid may be allowed to fill up the entire interior of the cavity including the space below the perforated flat plate 23. Subsequently, the petcock 31 at the bottom of the chamber may be opened so that the cleaning fluid may be drained off. With both petcocks open, compressed air may be blown into the chamber if desired to further remove contaminants. When the cleansing process is completed, both petcocks 30 and 31 may be closed and both flaps 15 and 18 returned to their normal positions.

It has already been mentioned that ionized particles tend to recombine or neutralize on the way to the processing chamber. Of course, the electrical field which is produced within the chamber will have a far greater effect when the various gases and droplets are strongly charged as compared to when such particles and droplets are charged only weakly or not ionized at all. Therefore, it may be considered desirable in certain applications of this invention to increase the ionization and charging of the exhaust gases at the expense of their translational energy prior to their entry into the processing chamber 10. This may be accomplished by placing one or more electro-magnetic coils 55 about the exhaust pipe which leads into the processing chamber 10 in the manner shown in FIGURE 3. Either a pulsed D.C. voltage or steady D.C. voltage may be applied to the windings comprising these coils, since it is only necessary that a relatively strong magnetic field be produced within the exhaust pipe in order to enhance low energy ionization of the gas particles and droplets passing through the interior of the exhaust pipe.

As previously mentioned also, the ordinary internal combustion engine produces exhaust gases when idling or at low speeds which have far more tendency to create smog than does the same engine when operating at high speed. In other words, at low r.p.m., the exhaust gases contain a far greater percentage of unburned hydrocarbons which encourage the production of smog. For efficient operation of this apparatus, it is desirable that the electrical field be of a greater intensity when the engine speed is low than when it is high. The desired results may be accomplished in the manner illustrated in FIGURES 4, 5, and 6. As shown in FIGURE 4, an electro-mechanical or electronic device may be employed for the purpose of producing high-voltage electrical pulses, with the amplitude of the pulses being substantially greater when their period is longer. Although any one of a number of satisfactory devices may be constructed which will produce this general result, a typical device satisfactory for the purpose is shown in FIGURE 5. Thus, input pulses appear at the input terminals 32 and 33, with one such pulse occurring for each firing of a cylinder of the engine. Each pulse is positive-going and drives the control grid of tube 234 positive so that a negative-going voltage pulse appears at the plate across plate load resistor 35. A bias voltage is developed across the parallel combination of resistor 36 and capacitor 37 in the grid circuit of 234 which is a function of the frequency of the input pulse. When the input pulses have a long period, the bias voltage thus developed is relatively low and this causes the plate voltage pulses to be quite large in amplitude. However, when the input pulses occur with greater rapidity, as when the engine is revolving with greater speed, the bias voltage between grid and cathode is increased and this causes the plate pulses to be diminished in amplitude. This operation of the circuit of FIGURE 5 is graphically illustrated in FIGURE 6 which shows the ignition pulses occurring first at a rapid and then also at a much slower rate. The grid bias voltage is shown as being considerably more negative when the input pulses have the high frequency and it is also shown that the output pulses which are provided are of low amplitude when the grid bias voltage is more negative.

Although the description given thus far has related particularly to a processing device and method which is particularly suitable for use in processing the exhaust gases from an internal combustion engine, it will be readily understood that the method of this invention is equally well adaptable to the processing of gases from other sources as well. FIGURE 7 illustrates one manner in which a device may be constructed in accordance with the general principles of this invention and which is particularly adapted for the processing of gases whose temperature is not sufficient to sustain a catalytic reaction.

FIGURE 7, a cylindrical chamber 40 is again illustrated having an inlet pipe 41 at one end and an outlet pipe 42 at the other. Instead of providing merely a plurality of conductive spheres along the center of the chamber, an electrically conductive rod is inserted in the center of the chamber 40 and is insulated from the rest of the chamber by a block of electrical insulating material 43. A source of energy 44, which may be an alternating-current generator, has its one output terminal connected to the inner conductive rod 45 and its other terminal connected to the outer wall of the chamber. As with the embodiment of the invention shown in FIGURE 1, the remainder of the volume within the chamber 40 is filled with a larger number of randomly intermixed dielectric and conductive spheres 50 and 51 respectively. As the output voltage of the alternator varies in amplitude, a constantly changing electrical field is produced between the inner rod 45 and the outer encircling coil 46, with the local character of the field being strongly affected by the presence of the conductive catalytic spheres which are randomly intermixed with and supported in an ungrounded state by the dielectric spheres within the chamber 40.

A helical coil 46 of electrically conductive material is wound about the interior of the chamber. The successive turns are all insulated from the chamber's surface so that they are not short-circuited thereby. A source of high-frequency alternating-current energy 55 is connected to the opposite terminals of this coil. The effect of this is to provide inductive heating of the conductive catalytic bodies 51, to thereby assure that their temperature is sufficiently elevated to sustain the catalytic reaction despite the fact that the gas particles and droplets may be of a relatively low temperature. The application to the coil 46 of a voltage which has a high frequency has the additional effect that there will be substantial dielectric losses in the non-conductive spheres 50. The resulting heating of the catalytic surfaces of these bodies also facilitates the catalytic reaction of the particles and droplets in the gas mixture with the catalytic surfaces 50 and additionally has the effect of increasing the temperature of the gas particles passing through the chamber which further aids in the catalytic reaction.

Gas particles and droplets passing through the chamber are affected in much the same manner as has already been described in connection with FIGURE 1 in that there is an increase in electrical charge on the particles and also many of the particles find themselves in an environment where they are electrostatically attracted toward an ungrounded metallic sphere having an effective temperature which is above the autoignition temperature of the particles and droplets so that many of such particles and droplets are burned or catalyzed and also many others tend to grow in size as they pass through the chamber so that upon being expelled through the exhaust pipe 42, they are of such size that they tend to drop rather than to be scattered in the atmosphere where they would otherwise tend to create smog particles.

In each of the disclosed environments, the electrical field is applied intermittently and it has been described that the intermittent nature of the field produces certain advantages. However, it should be understood that the invention is not limited to a method and apparatus where an intermittent application of the electrical field occurs but that steady application of the field is also comprehended.

Having described an improved process and apparatus for the treatment of gases and particularly the treatment of exhaust gases from an internal combustion engine, I desire it to be understood that various modifications, adaptations, and alterations may be made to the specific method and apparatus disclosed without in any manner departing from the spirit or scope of this invention.

What I claim is:

1. An apparatus for treating gases containing unburned hydrocarbons comprising, a chamber through which said gases are propelled under pressure, a plurality of electrically conductive catalytic bodies, means for maintaining said bodies in random positions throughout the interior of said chamber, and for electrically insulating substantially all said bodies from each other and from the walls of said chamber, and means for applying a strong electrical field throughout the space within the interior of said chamber, whereby those of said conductive bodies which are electrically insulated produce a strong electric field in the region near their surface to thereby cause a substantial number of said unburned charged or uncharged hydrocarbon particles to become ignited or catalytically cracked upon contacting the surface of said conductive bodies, at least one electrode axially disposed within said chamber, said electrical means including a source of high-voltage energy connected between said electrode and the outer wall of said chamber.

2. The apparatus of claim 1 in which said chamber is of elongate form and said electrode has its length substantially co-extensive with the length of said chamber.

3. The apparatus defined in claim 2 wherein said chamber has a circular cross-section and said electrode is in the form of a rod whose center lies substantially along the central axis of said cylinder.

4. The apparatus defined in claim 1 wherein said electrodes comprise a plurality of electrically conductive elements which are spaced in the direction of flow of said gases through said chamber, said electrical means applying a high amplitude of voltage intermittently between each said electrode and the outer wall of said chamber.

5. In an apparatus of the treatment for gases at temperatures below that required in catalysis to reduce their hydrocarbon content the combination comprising, a low impedance chamber through which said cool gases are caused to flow, means including at least one electrode within said chamber and also including a source of high-voltage for applying an electrical field throughout the interior of said chamber, a packing of intermixed electrically conductive catalytic and non-conductive shaped bodies within said chamber and exposed to said electrical field, and heating means for heating said conductive and non-conductive elements.

6. The apparatus as defined in claim 5 wherein said heating means comprises a coil wound about at least a portion of said chamber and also a source of high-frequency electrical energy connected to said coil.

References Cited by the Examiner
UNITED STATES PATENTS

| | | | |
|---|---|---|---|
| 1,756,897 | 4/30 | Bilsky | 204—314 |
| 2,288,943 | 7/42 | Eastman. | |
| 2,880,079 | 3/59 | Cornelius | 60—29 X |
| 2,988,432 | 6/61 | Long | 23—288 |
| 2,990,912 | 7/61 | Cole | 55—130 |
| 2,998,308 | 8/61 | Ruth | 204—170 X |

JULIUS E. WEST, *Primary Examiner.*
JOHN R. SPECK, *Examiner.*